United States Patent [19]
Brambilla et al.

[11] Patent Number: 5,876,583
[45] Date of Patent: Mar. 2, 1999

[54] METHOD FOR EXCLUDING A MALFUNCTIONING ELEMENTARY CELL IN A MEMBRANE ELECTROLYZER OR ELECTROCHEMICAL GENERATOR

[75] Inventors: Massimo Brambilla, Bussero; Claudio Mantegazza, Saronno, both of Italy

[73] Assignee: De Nora S.p.A., Italy

[21] Appl. No.: 936,494

[22] Filed: Sep. 8, 1997

[30]    Foreign Application Priority Data

Oct. 3, 1996  [IT]  Italy .................................. MI96A2037

[51] Int. Cl.[6] .................. C25B 1/24; H01M 6/50
[52] U.S. Cl. ............. 205/334; 429/49; 205/343
[58] Field of Search ................... 205/334, 344, 205/350, 343, 498; 204/255; 429/49

[56]              References Cited

U.S. PATENT DOCUMENTS

| 4,045,325 | 8/1977 | Schwickart et al. | 204/256 X |
| 4,371,433 | 2/1983 | Balko et al. | 204/255 X |
| 4,923,582 | 5/1990 | Abrahamson et al. | 204/255 |
| 5,308,713 | 5/1994 | Mayer et al. | 429/49 |

*Primary Examiner*—Donald R. Valentine
*Attorney, Agent, or Firm*—Bierman, Muserlian and Lucas

[57]              ABSTRACT

The invention concerns membrane electrolyzers suitable for processes such as water or hydrogen halides electrolysis, as well as electrochemical generators fed with gases containing hydrogen and oxygen for direct conversion into electric energy. These apparatuses generally consist of a filter-press assembly of conductive bipolar plates (2), electrodes (4), sealing gaskets (5) membranes (6) and internal longitudinal ducts for feeding the reactants and withdrawing the products and residual reactants. The invention is directed to the method for repairing said electrolyzers or generators when an elementary cell is malfunctioning. This method comprises making at least two perforations in the peripheral area of the bipolar plates (2) and/or gaskets (5) of the malfunctioning cell to reach distribution channels (9, 11) which connect the compartments containing the electrodes (4) with said longitudinal ducts. A sealing means (agent) is then injected through the perforations (12) in order to form suitable occlusions (14, 15) in the distributions channels (9, 11) and in the perforations (12) respectively. To facilitate the perforation procedure, the bipolar plate (2) and/or the gaskets (5) may be provided with blind aid-holes in the peripheral area. Upon sealing the distribution channels (9, 11) and the perforations (12), the bipolar plates (2) delimiting the malfunctioning cell are externally short-circuited and the electrolyzer or generator is ready for operation.

10 Claims, 10 Drawing Sheets

METHOD FOR EXCLUDING A MALFUNCTIONING ELEMENTARY CELL IN A MEMBRANE ELECTROLYZER OR ELECTROCHEMICAL GENERATOR

BACKGROUND OF THE INVENTION

Known in the art are electrolysis or power generation processes carried out in filter-press structures comprising an arrangement of electrochemical cells. The typical elementary electrochemical cell suitable for said processes usually has a reduced thickness in order to minimize the energy consumption. Typically the elementary cell is delimited by two conductive plates enclosing a couple of peripheral sealing gaskets, an ion exchange membrane, a couple of electrodes and a couple of current collectors/distributors. The plates and/or gaskets have holes connecting the anodic and cathodic compartments by means of distribution channels. A multiplicity of elementary cells is generally assembled in a filter-press arrangement to form an electrolyzer or electric current generator. Therefore the electrolyzer or generator is made of a series of bipolar plates, gaskets, membranes, electrodes and current collectors/distributors. In particular the alignment of the holes in the plates and gaskets forms longitudinal ducts which are connected to suitable nozzles positioned at one or both ends of the electrolyzer or generator. The reactants and the reaction products, in some cases mixed with the residual reactants, are fed or withdrawn through these nozzles and ducts. Distribution channels permit feeding the reactants to each elementary cell and withdrawing the products and residual reactants therefrom. An assembly of elementary cells as above is described in the European patent application No. EP 0629015 A1 by the same applicant. These assemblies, typically having a series electrical connection, are put out of operation even if only one of the elementary cells is malfunctioning, that is to say if even only one of the electrodes (for example if the electrocatalytic activity is scarce) or only one of the collectors (for example due to increased electrical resistance caused by improper composition or mechanical characteristics) do not properly work or if holes are present in the membrane. This last occurrence is particularly dangerous as it may lead to mixing of incompatible reactants or products, as it is the case in electric current generators where a hole in a membrane causes mixing of oxygen and hydrogen with the consequent ignition of the mixture caused by the electrocatalytic material applied to the electrodes. Therefore the method for externally short-circuiting a malfunctioning cell, as described in the European patent application No. EP 0629015 A1, solves only partially the problem as it allows the electric current to by-pass the malfunctioning cell but does not eliminate possible inconveniences connected with the mixing of the reactants and/or products in case of damages to the membrane. In fact, reactants and products are in any case present in the elementary cell containing the damaged membrane due to the connection between the cell and the longitudinal feed and withdrawal ducts through the distribution channels. As a consequence, a damaged membrane not only hinders operation of the electrolyzer or generator, as it happens when the electrodes or the current collectors/distributors are defective, but also poses safety problems. In the case of damaged membranes, an efficient repairing method is not found in the prior art. Therefore, it would be necessary to disassemble the electrolyzer or generator, or at least open the same in correspondence of the malfunctioning cell, to remove and replace the damaged membrane. This procedure is extremely delicate as further damages are often caused to elementary cells initially free from defects. Further, from the operating point of view, this procedure is time consuming and therefore economically disadvantageous.

It is an object of the present invention to overcome the drawbacks of the prior art by disclosing an efficient method for repairing malfunctioning elementary cells which permits to restore the best operating conditions of an electrolyzer or electric current generator without any need for opening and replacing the damaged or defective parts.

The invention will be now described making reference to the figures, wherein.

Making reference to FIG. 1, the various components of the membrane electric current generator or electrolyzer are identified as follows:

(1) clamping grids, which, by means of hydraulic jacks or tie-rods (not shown in the figure) tighten together the components under pressure (2) bipolar plates provided with external connections (7) for short-circuiting or excluding malfunctioning cells (3) current collectors/distributors housed in gaskets (5) having a suitable profile or in a recess provided in the bipolar plates (2)

(4) catalytic electrodes (5) gaskets for the peripheral sealing (6) ion exchange membranes.

Figure 1:
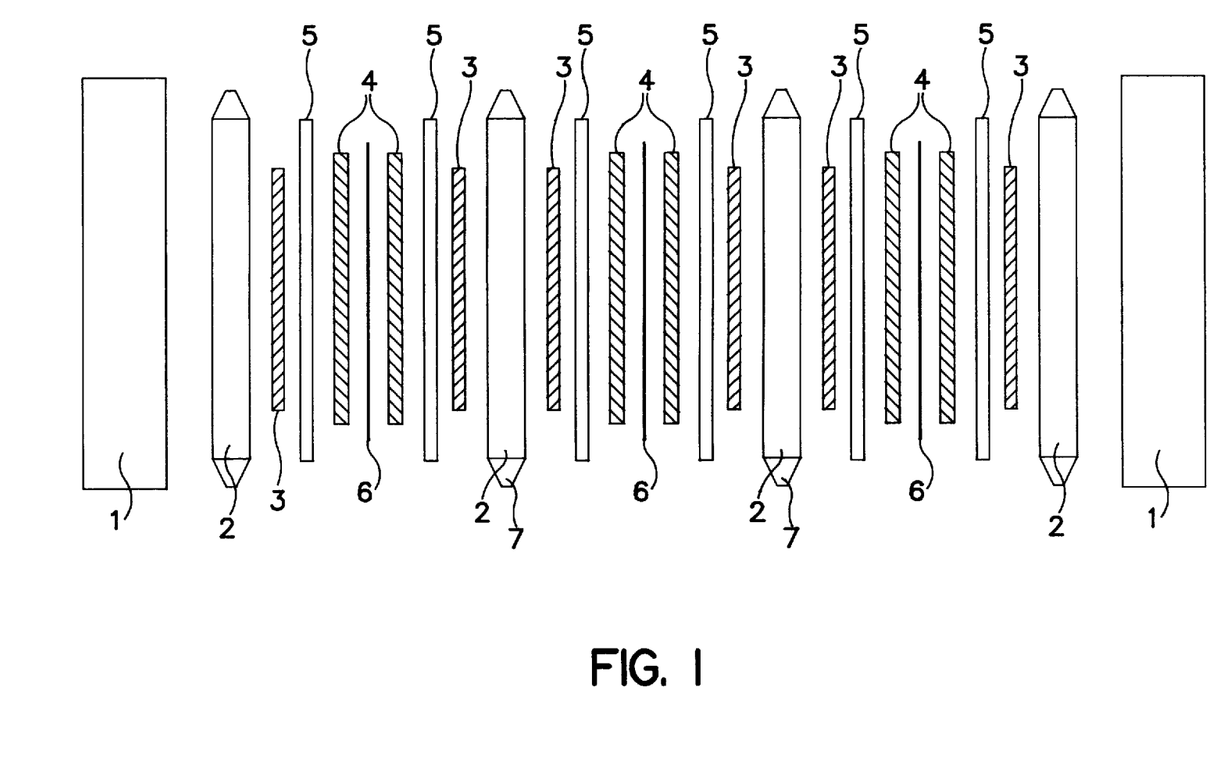
FIG. 1 is an exploded cross-section view of a membrane electric current generator or electrolyzer
Figure 2:
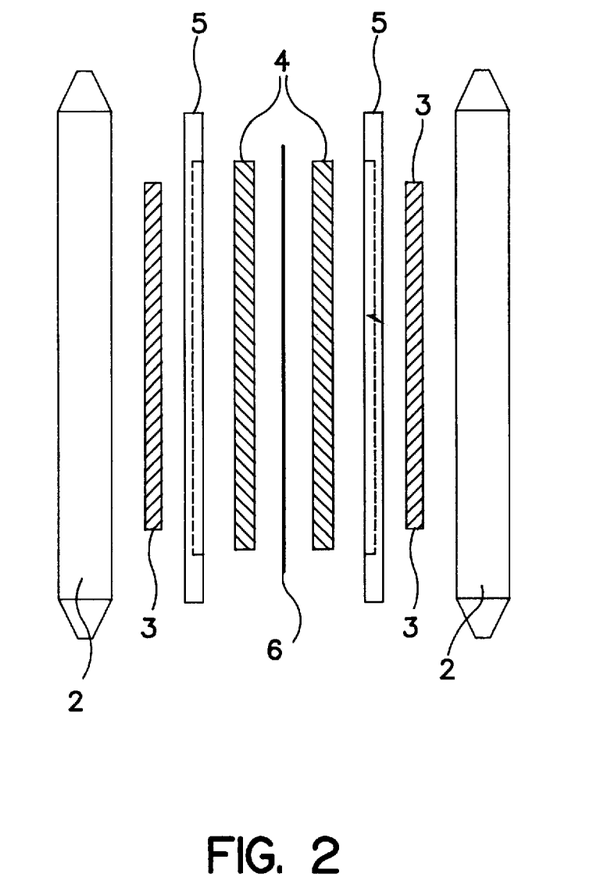
FIG. 2 is an exploded cross-section view of a unitary cell of the generator or electrolyzer of FIG. 1
Figure 3:
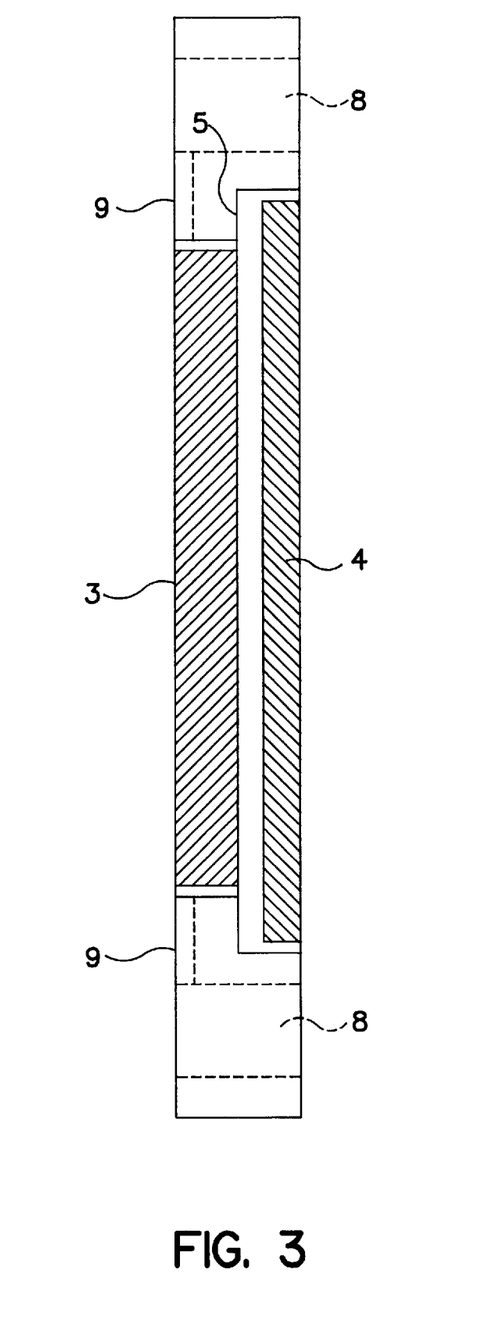
FIG. 3 is a cross section of assembled components of the unitary cell of FIG. 3
Figure 4:
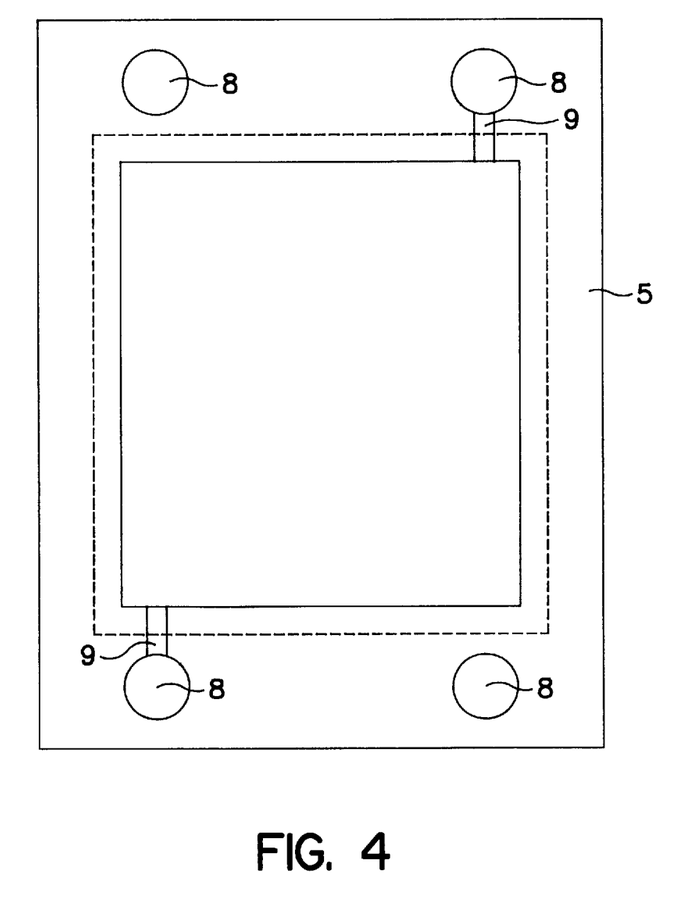
FIG. 4 is a front view of the gasket of FIG. 3.

FIG. 2 and 3 show respectively one elementary cell of the electrolyzer or generator of FIG. 1 and the housing of a current collector/distributor (3) and of a catalytic electrode (4) inside a first type of gasket (5).

In FIG. 3 reference numeral (8) identifies the holes for feeding and withdrawing the reactants and the reaction products and reference numeral (9) identifies the distribution channels incorporated in the gasket body which connect holes (8) with the cavity (indentation) formed in the gasket and occupied by the porous current collector/distributor (3) and by the electrode (4). Similar holes (not shown in the figures) are present in the bipolar plates (2). The arrangement of a multiplicity of gaskets and bipolar plates, with the consequent alignment and coupling of the holes (8) of the gaskets and of the bipolar plates forms longitudinal channels crossing the whole assembly of the electrolyzer or generator of FIG. 1. These channels provide for the distribution of the reactants to all the elementary cells and for the withdrawal of the reaction products from the same.

Figure 5:
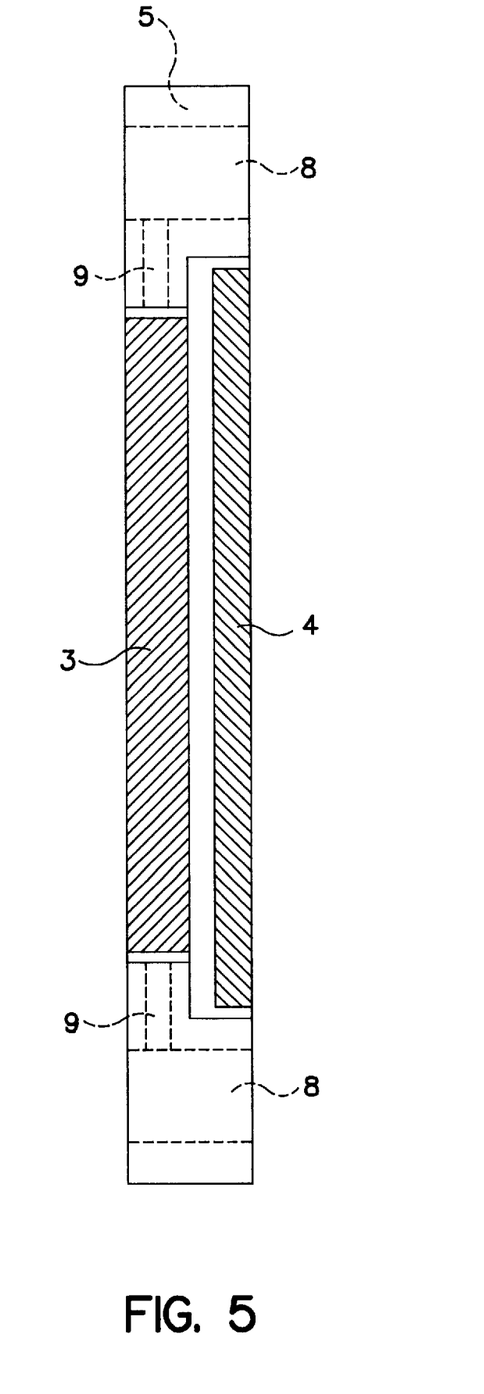
FIGS. 5, 6, 7 and 8 show different embodiments of FIG. 3.
Figure 6:
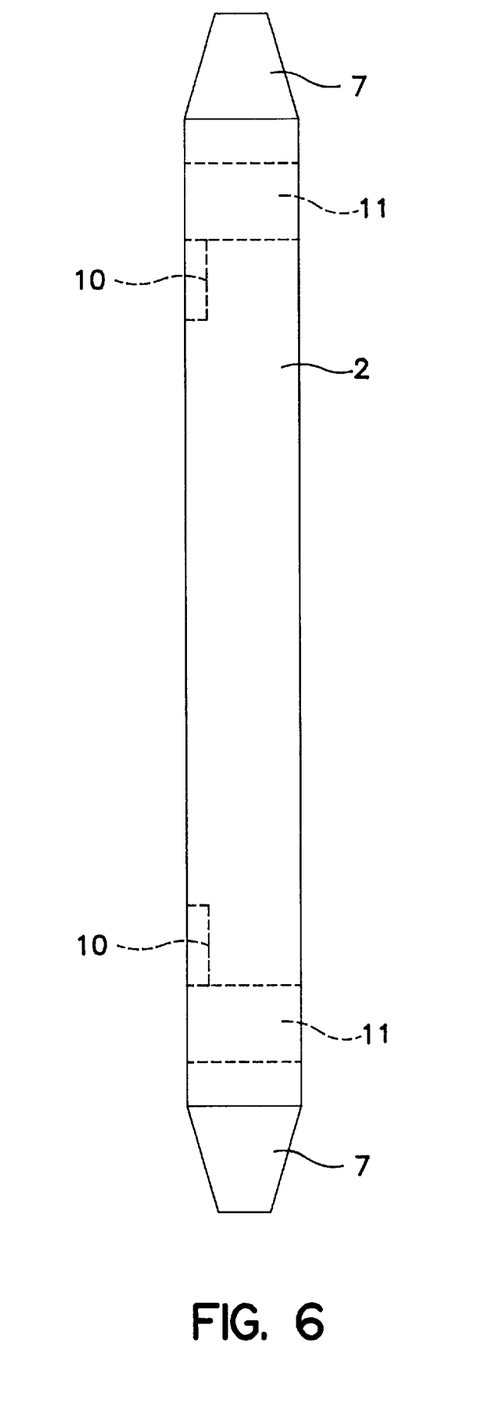
Figure 7:
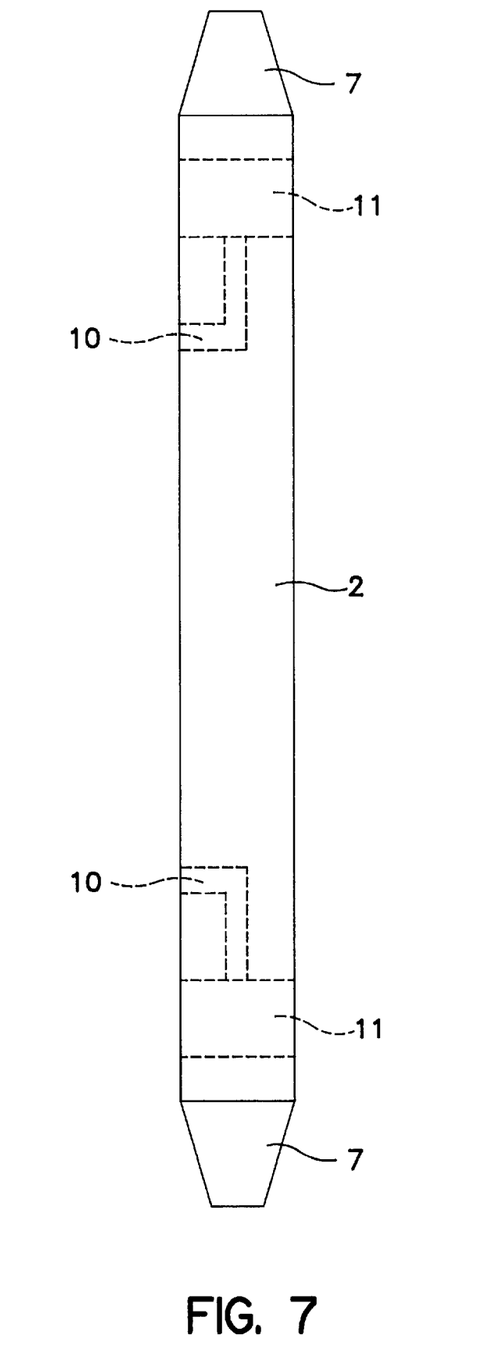
Figure 8:
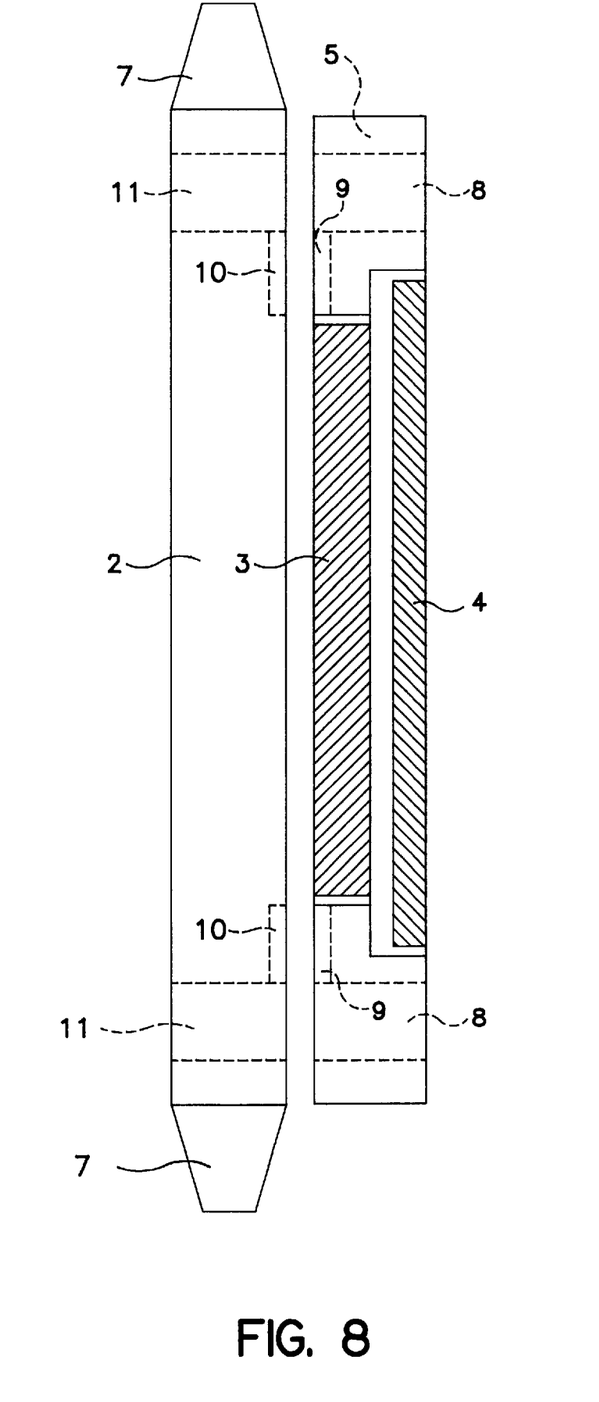

Different embodiments of the distribution channels are shown in FIG. 5 and 6. In FIG. 6 the distributor channels are incorporated in the bipolar plates (2) as an alternative to gaskets (5). In this case the distribution channels are identified by reference numeral (10) and the holes by reference numeral (11). Another embodiment of FIG. 6 is shown in FIG. 7 and in FIG. 8. In FIG. 8 the distribution channels are incorporated both in the bipolar plates (2) and in the gaskets (5). This is substantially a combination of the embodiments shown in FIGS. 3 and 5. The advantage offered by this embodiment is the higher flow section available for the distribution of the reactants and the withdrawal of the products, particularly useful in the case of large size electrolyzers or generators.

Figure 9:
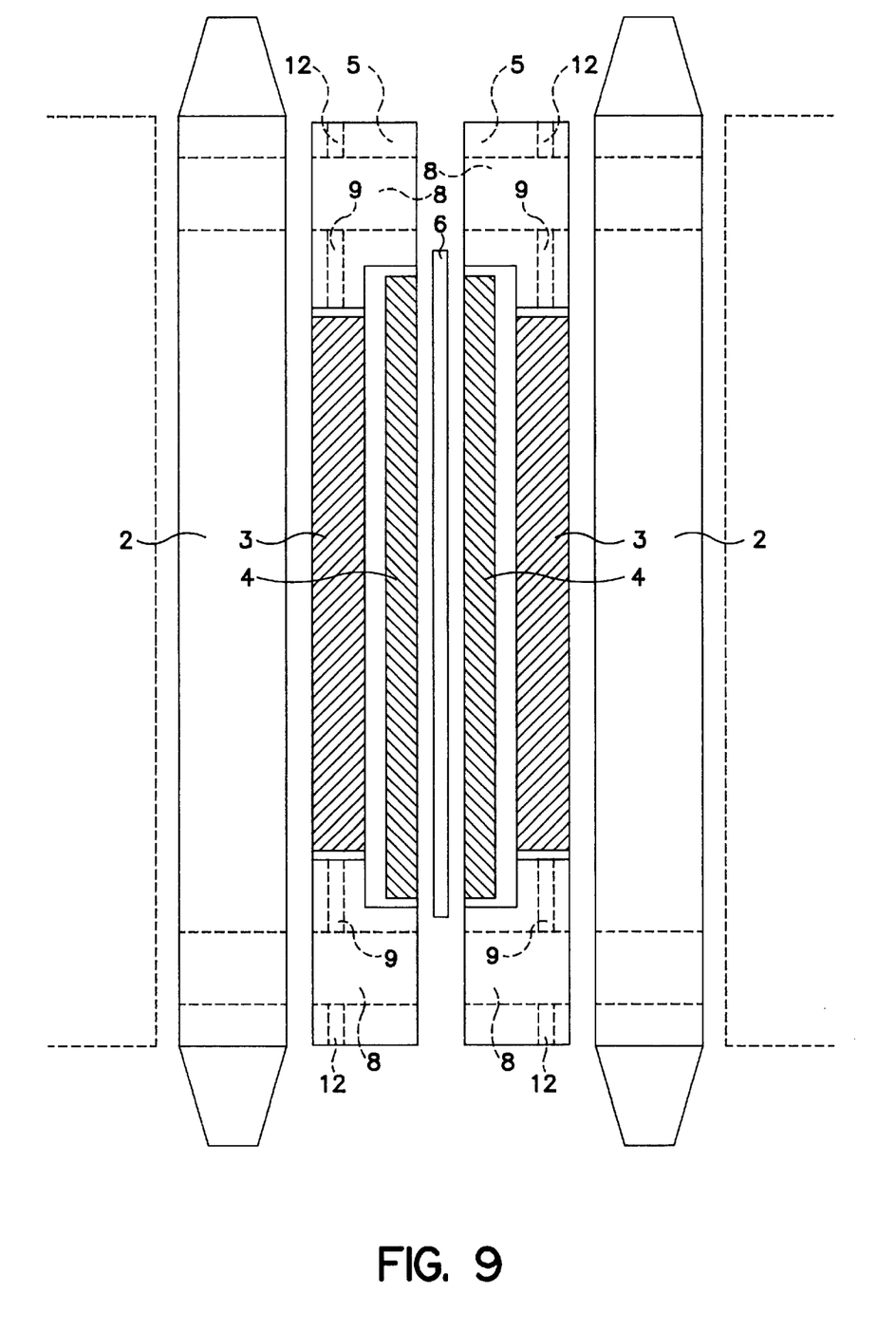
FIG. 9 is a cross-section of the unitary cell of FIG. 2
Figure 10:
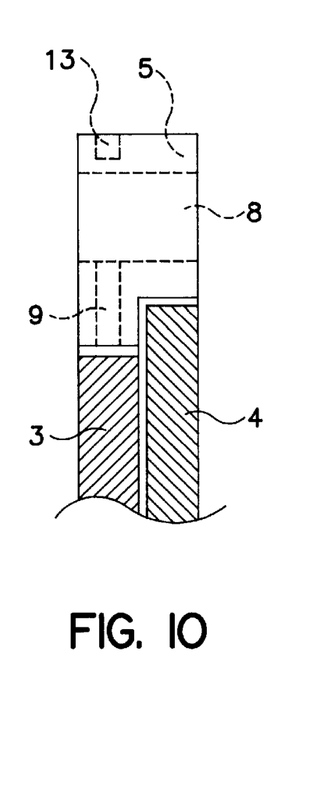
FIG. 10 shows a detail of the gasket of FIG. 5
Figure 11A:
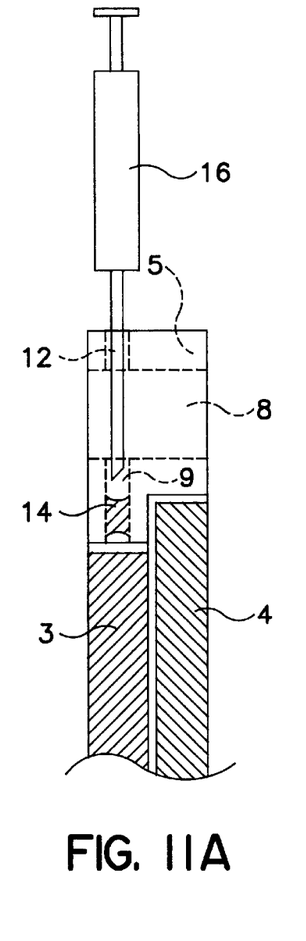
FIG. 11 show the two steps of the sealing procedure of the invention.
Figure 11B:
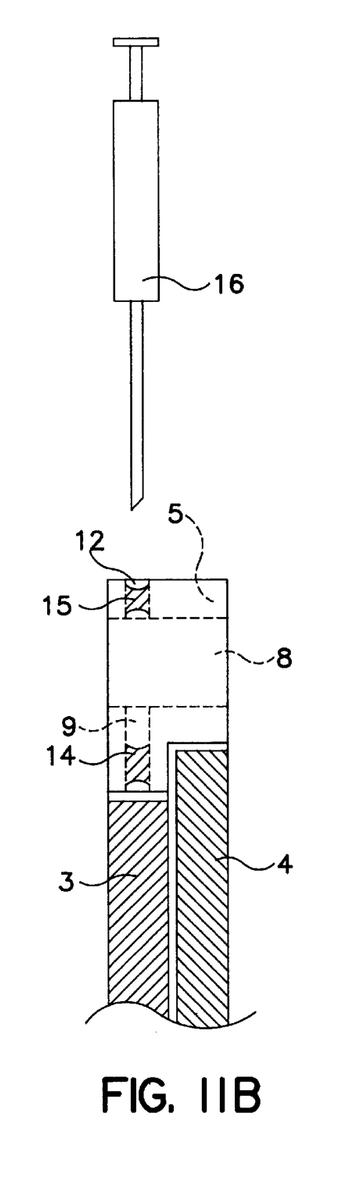

As previously said, the bipolar plates (2) and the gaskets (5) of FIGS. 3, 4, 5, 6, 7 and 8 are assembled together with the current collectors/distributors (3), electrodes (4) and ion exchange membranes (6) to form the electric current generator or electrolyzer schematically shown in FIG. 1. When one of the elementary cells is malfunctioning, as a consequence of an erroneous assembling or defects in the components, its voltage remarkably differs from the average value of the other cells. Therefore a periodical measurement of the electric voltages of the elementary cells during operation of the electrolyzer or generator permits to quickly detect anomalies. In this occurrence, that is when an elementary cell is characterized by an anomalous voltage, the method of the present invention permits to keep the electrolyzer or generator operating under safe conditions without any need to open and disassemble the same. In fact, the method of the present invention comprises perforating, by means of a suitable tool, for example an electric or manual boring machine having a drill of suitable diameter, the peripheral area of the elements of the malfunctioning unitary cell wherein the distribution channels are incorporated, such as the gaskets (see FIGS. 3 and 5) or the bipolar plates (see FIGS. 6 and 7). Perforation is carried out without disassembling or opening the electrolyzer or generator. To ensure completely safe conditions, before starting the perforation, the electrolyzer or generator must be temporarily shut down to remove the reactants contained inside by flushing with an inert fluid, such as nitrogen. The gaskets or bipolar plates to be perforated are those enclosing the pair of electrodes characterized by an anomalous electric voltage. In FIG. 9 the pair of electrodes (4), enclosed between the two bipolar plates (2) and the current distributors/collectors (3), encloses the membrane (6) which is thought to be defective or damaged. The distributor channels are incorporated in the gaskets (5), as illustrated in FIG. 5. FIG. 9 clearly shows that the perforations (12) are made in correspondence of the holes (8) which are connected with the distribution channels (9). The complete exclusion of a malfunctioning cell requires at least two perforations, but preferably four, two for each gasket. In a particularly preferred embodiment of the present invention the peripheral area of the gaskets (5) contains blind aid-holes (13) aligned with the respective distribution channels (9), as shown in FIG. 10, which schematizes a detail of the gasket (5) of the type illustrated in FIG. 5. In this case the holes (13) have the function of guiding the perforation drill so that once the procedure is completed the perforation (12) makes the respective distribution channel perfectly accessible. After completing the perforation, the method of the invention comprises injecting, by means of a suitable tool, such as a syringe provided with a thin needle, a sealing agent inside the distribution channels (9) and then inside the perforations (12). The two steps of the sealing procedure are schematized in FIG. 11, illustrating a detail of the gasket of the type represented in FIG. 5. Reference numerals (14) and (15) indicate respectively the occlusions of the distribution channels (9) and of the perforations (12). Reference numeral (16) indicates the injecting tool. The sealing agent, once hardened, performs two distinct functions: the portion occluding the perforations (12) ensures sealing against the environment to avoid gas emissions or fluid leakage even when the electrolyzer or generator operates under pressure, while the portion occluding the distribution channels (9) ensures for a perfect separation of the compartments containing the current collectors/distributors and the electrodes from the longitudinal ducts for feeding the reactants and withdrawing the products. According to a less preferred embodiment of the invention, the number of perforations may be reduced and consequently only one compartment containing a current collector/distributor and one electrode is sealed. In this case only one gasket and/or only one bipolar plate are perforated. Obviously this procedure permits to save time but the reliability is lower than that ensured by sealing both compartments of the malfunctioning cell.

Once perforation and sealing is completed, the bipolar plates (2) of the malfunctioning elementary cell are short-circuited by means of connections (7) (in FIG. 1), or the cell is excluded. The electrolyzer or generator may be then started up again under completely safe conditions. In fact, the short-circuiting or exclusion deviates or hinders the electric current flow and therefore the cells, without any current flowing therethrough, generate no products. Further, as already said, the products and reactants contained in the longitudinal ducts cannot penetrate in the compartments of the malfunctioning cell. As a consequence, there is no risk of any dangerous mixing of reactants and products occurring through a defective membrane. As regards the type of sealing agent to be used, the following selection criteria must be taken into account:

absence of volatile components capable of being adsorbed by the catalytic surface of the electrodes with consequent poisoning of the catalyst.

Stability when in contact with the reactants and products circulating inside the electrolyzer or generator.

Hardening at ambient temperature or at a temperature compatible with the integrity of the various components of the electrolyzer or generator.

Sealing properties, which also depend on the compatibility of the chemical composition of the gaskets and/or bipolar plates and that of the sealing agent itself.

Using the materials described in the European patent publication No. 0629015A1, that is a thermoplastic material such as Hytrel® commercialized by Du Pont for the gaskets, and aluminum alloy for the bipolar plates, it has been found that the preferred sealing agents are epoxy-based bi-components or silicon-based materials with a low content of acetic acid, both easily available on the market.

It is understood that the invention is not limited to these types of sealing agents as certainly many other types could be used provided that they comply with the general criteria illustrated above.

The present invention has been described in detail in connection with electrolyzers or current generators wherein the distribution channels are incorporated in the gaskets, according to the embodiment illustrated in FIG. 5. It is evident that the invention applies also to electrolyzers or generators where the distribution channels are provided in the gaskets as illustrated in FIG. 3 or in the bipolar plates as illustrated in FIGS. 6 and 7 or concurrently in the gaskets and bipolar plates as illustrated in FIG. 8. In all of these cases the procedure is exactly the same as described in connection with the embodiment of FIG. 5. The perforation procedure is the same, likewise useful are the blind aid-holes and the sealing is carried out in the same way.

Without departing from the spirit and scope of this invention, one with ordinary skill can make various changes and modifications to this invention to adapt it to the various uses and conditions. As such, these changes and modifications are properly, equitably and intended to be within the full range of equivalents of the following claims.

We claim:

1. Method for excluding a malfunctioning elementary cell of a membrane electrolyzer or a membrane electrochemical electric current generator comprising a multiplicity of elementary cells assembled in a filter-press arrangement, said multiplicity of cells comprising a series of bipolar plates (2), gaskets (5), electrodes (4), membranes (6), said gaskets and/or bipolar plates incorporating distributors channels (9, 11), suitable for connecting said elementary cell to longitudinal ducts for feeding reactants and withdrawing products in the electrodic compartment of each cell, characterized in that it comprises making perforations (12) on the peripheral areas of said gaskets (5) and/or bipolar plates (2) of said elementary cell containing a malfunctioning membrane providing an access to said distribution channels (9, 11), injecting a sealing means through said perforations (12) which, upon hardening, forms occlusions (14, 15) in the distribution channels (9, 11) and in the perforations (12) respectively.

2. The method of claim 1 characterized in that said peripheral areas of the gaskets (5) and/or bipolar plates (2) of said malfunctioning elementary cell are provided with blind aid-holes (13).

3. The method of claim 1 characterized in that said sealing means is an epoxy bi-component or a silicon based material.

4. The method of claim 1 characterized in that said perforations (12) are made on the gaskets (5) only.

5. The method of claim 1 characterized in that said perforations (12) are made on the bipolar plates (2) only.

6. The method of claim 1 characterized in that said perforations (12) are made both on the bipolar plates (2) and on the gaskets (5).

7. The method of claim 1 characterized in that said perforations (12) are made on both bipolar plates (2) and/or both gaskets (5).

8. The method of claim 1 characterized in that said perforations (12) are made on only one of the bipolar plates (2) and/or only one the gaskets (5) of said malfunctioning elementary cell.

9. The method of claim 1 characterized in that said membrane (6) is an ion exchange membrane.

10. The method of claim 1 characterized in that said membrane (6) is a separator suitable for avoiding mixing of the reactants contained in the electrodic compartments.

* * * * *